US 8,397,290 B2

(12) United States Patent
Coles et al.

(10) Patent No.: US 8,397,290 B2
(45) Date of Patent: Mar. 12, 2013

(54) GRANTING LEAST PRIVILEGE ACCESS FOR COMPUTING PROCESSES

(75) Inventors: Neil Laurence Coles, Redmond, WA (US); Scott Randall Shell, Kirkland, WA (US); Upender Reddy Sandadi, Issaquah, WA (US); Angelo Renato Vals, Redmond, WA (US); Matthew G. Lyons, Palatine, IL (US); Christopher Ross Jordan, Redmond, WA (US); Andrew Rogers, Bellevue, WA (US); Yadhu Gopalan, Issaquah, WA (US); Bor-Ming Hsieh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 12/163,164

(22) Filed: Jun. 27, 2008

(65) Prior Publication Data
US 2009/0328180 A1 Dec. 31, 2009

(51) Int. Cl.
*G06F 21/00* (2006.01)
(52) U.S. Cl. .................................. 726/20; 726/1; 726/9
(58) Field of Classification Search .................. 726/9, 1, 726/20
See application file for complete search history.

(56) References Cited

U.S. PATENT DOCUMENTS

| 5,187,790 | A | 2/1993 | East et al. ...................... 395/725 |
| 5,586,260 | A * | 12/1996 | Hu ................................... 726/12 |
| 6,279,111 | B1 * | 8/2001 | Jensenworth et al. ........... 726/10 |
| 6,338,064 | B1 | 1/2002 | Ault et al. .......................... 707/9 |
| 6,377,994 | B1 | 4/2002 | Ault et al. ..................... 709/229 |
| 6,385,724 | B1 | 5/2002 | Beckman et al. ............. 713/167 |
| 6,412,070 | B1 * | 6/2002 | Van Dyke et al. ............... 726/17 |
| 6,604,198 | B1 | 8/2003 | Beckman et al. ............. 713/167 |
| 7,188,254 | B2 | 3/2007 | Somin et al. .................. 713/185 |
| 2005/0091535 | A1 * | 4/2005 | Kavalam et al. .............. 713/201 |
| 2005/0091655 | A1 | 4/2005 | Probert et al. |
| 2006/0137021 | A1 | 6/2006 | Bender et al. .................... 726/27 |
| 2006/0193467 | A1 | 8/2006 | Levin ........................ 379/413.04 |
| 2006/0248585 | A1 | 11/2006 | Ward et al. |
| 2006/0259947 | A1 * | 11/2006 | Aarnos et al. ...................... 726/1 |
| 2006/0259980 | A1 | 11/2006 | Field et al. |
| 2006/0265597 | A1 | 11/2006 | Carey et al. ................... 713/182 |
| 2007/0011452 | A1 * | 1/2007 | Marquet et al. ............... 713/168 |

(Continued)

OTHER PUBLICATIONS

Lap Chung Lam et al. "Accurate and Automated System Call Policy-Based Intrusion Prevention" Jun. 25-28, 2006, proceedings of the 2006 International Conference on Dependable Systems and Networks, pp. 413-424.*

(Continued)

*Primary Examiner* — Kambiz Zand
*Assistant Examiner* — Michael Guirguis
(74) *Attorney, Agent, or Firm* — Merchant & Gould

(57) ABSTRACT

Embodiments provide a security infrastructure that may be configured to run on top of an existing operating system to control what resources can be accessed by an applications and what APIs an application can call. Security decisions are made by taking into account both the current thread's identity and the current thread's call chain context to enable minimal privilege by default. The current thread context is captured and a copy of it is created to be used to perform security checks asynchronously. Every thread in the system has an associated identity. To obtain access to a particular resource, all the callers on the current thread are analyzed to make sure that each caller and thread has access to that resource. Only when each caller and thread has access to that resource is the caller given access to that resource.

18 Claims, 11 Drawing Sheets

U.S. PATENT DOCUMENTS

2007/0300285 A1    12/2007    Fee et al. .......................... 726/1

OTHER PUBLICATIONS

Brundrett, Peter, "Kerberos authentication in Windows NT 5.0 domains," Jan. 24, 2008, [online], 7 pgs., http://www.usenix.org/publications/login/1998-5/brundrett.html.

Sabbadin, Enrico, ".NET Identity and Principal Objects Part 3: Identity Flow and Impersonation Across Process and Machine Boundaries," Feb. 13, 2004, 2 pgs., http://www.informit.com/articles.aspx?p=169580&seqNum=2.

"How Access Tokens Work," Microsoft® TechNet, Mar. 28, 2003 11 pgs., http://technet2.microsoft.com/windowsserver/en/library/d06a5070-2a7b-4e75-b7e9-ebe51f65e34b1033.mspx?mfr=true.

International Search Report having International application No. PCT/US2009/048461 dated Dec. 30, 2009.

Supplementary European Search Report having European application No. 09 77 0938 dated Nov. 17, 2011.

* cited by examiner

GRANTING LEAST PRIVILEGE ACCESS FOR COMPUTING PROCESSES

BACKGROUND

A device may be configured with a security infrastructure that controls access to resources, applications, etc. Currently on mobile devices, trust is assigned to individual applications based on code identity. A security infrastructure determines what applications may run on the device, what applications can be locked out, what applications can be run in what context, and what resources such application can access. Current trust levels include "trusted", "normal", and "untrusted" for unsigned modules. An application or a module can be signed with a trusted certificate or a certificate that chains to a trusted certification store. In this case, that module is considered to be trusted and as such, any code in that module has access to all the privileged APIs and resources on the system. Trust decisions are based on the caller's application trust level.

However, there are several problems with the current security model mentioned above. When a thread migrates through multiple protected server library (PSL) servers in the system, it is possible that an immediate calling process in the call chain has permission to access a system resource, but examine of the entire call chain context may reveal that the resource should not be accessible. Such security cannot be enforced if the security decisions are always based solely on the immediate caller's context. Also, the current security model does not provide for impersonating a different identity where a low privileged application calls into a system service, wherein the system service is asked to process the request based either on the caller's context or on its own context. Still further, for asynchronous access requests, the current security model does not provide for security checks in a secondary thread where a caller context might not be fully available.

It is respect to these and other considerations the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to make security decisions by taking into account both the current thread's identity and the current thread's call chain context to enable minimal privilege by default. The current thread context is captured and a copy of it is created to be used to perform security checks asynchronously. Every thread in the system has an associated identity. Initially this identity is derived from the parent process. However, over the thread lifetime it is possible that this identity could change based on any impersonations of the thread.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide a security infrastructure that may be configured to run on top of an existing operating system to control what resources can be accessed by an applications and what APIs an application can call. Security decisions are made by taking into account both the current thread's identity and the current thread's call chain context to enable minimal privilege by default. The current thread context is captured and a copy of it is created to be used to perform security checks asynchronously. Every thread in the system has an associated identity. Initially this identity is derived from the parent process but over the thread lifetime it is possible that this identity could change based on any impersonations thread does.

Embodiments not only analyze what a call or application is requesting, but also analyze where the call is coming from. Embodiments also may provide a security infrastructure for a system that is open-ended so the end user or an end operator can install different applications that might not be under their own control. Thus, all threads in the system may be run with the least privilege by default to prevent security issues from occurring based upon a thread being incorrectly accessed from a resource that the thread does not have the authority to access. Rather, access a particular resource, all the callers on the current thread are analyzed to make sure that each caller and thread has access to that resource. Only when each caller and thread has access to that resource is the caller given access to that resource.

Embodiments of the present invention may be implemented using data structures that provide the security infrastructure for controlling which resources can be accessed by applications and what APIs an application can call. The data structure includes the following elements: Security Identifier (SID), Security Token, Security Descriptor (SD), Access Control List (ACL), and Access Control Entry (ACE).

Figure 1:
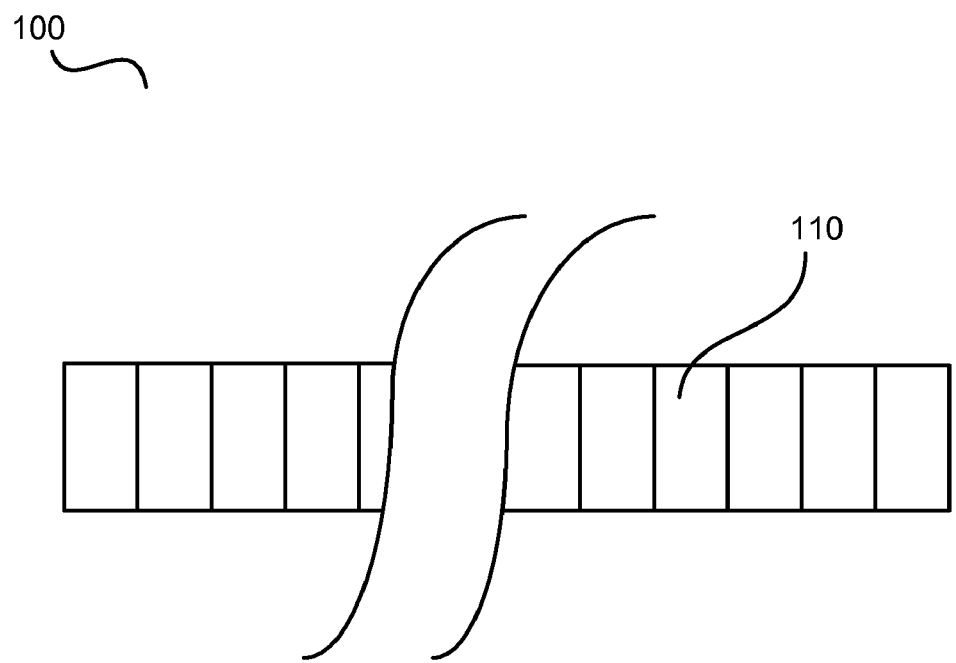
FIG. 1 illustrates a Security Identifier (SID) 100 according to an embodiment of the present invention.

FIG. 1 illustrates a Security Identifier (SID) 100 according to an embodiment of the present invention. The SID 100 is a variable length data structure 110 that defines a unique ID within a system and specifies what account a particular thread is running on. The SID 100 may also be thought of as being like a user account. For example, when someone logs onto a computer, various user accounts may be accessible using the appropriate logon passwords. The user account identifies the person logging on to the computer. The SID 100 is simply an account that identifies the thread or process. The SIDs 100 are only unique within a particular device. However, those skilled in the art will recognize, after analyzing the description of the embodiments of the present invention herein, that global security identifiers could be used.

On the desktop, SIDs 100 may be assigned to individual user accounts, certain system accounts, and certain user groups. Note that an account in WINDOWS® CE operating system, for example, is not necessarily the same definition as used in reference to the desktop WINDOWS® operating system. Nevertheless, those skilled in the art will understand what constitutes an account. Herein, the SID 100 is assumed to be a unique identifier across the entire operating system, e.g., WINDOWS® CE operating system, that maps to an entry in the account database. The entry in the account database specifies what basic and extended privileges are assigned to a particular account (a.k.a. SID).

Figure 2:
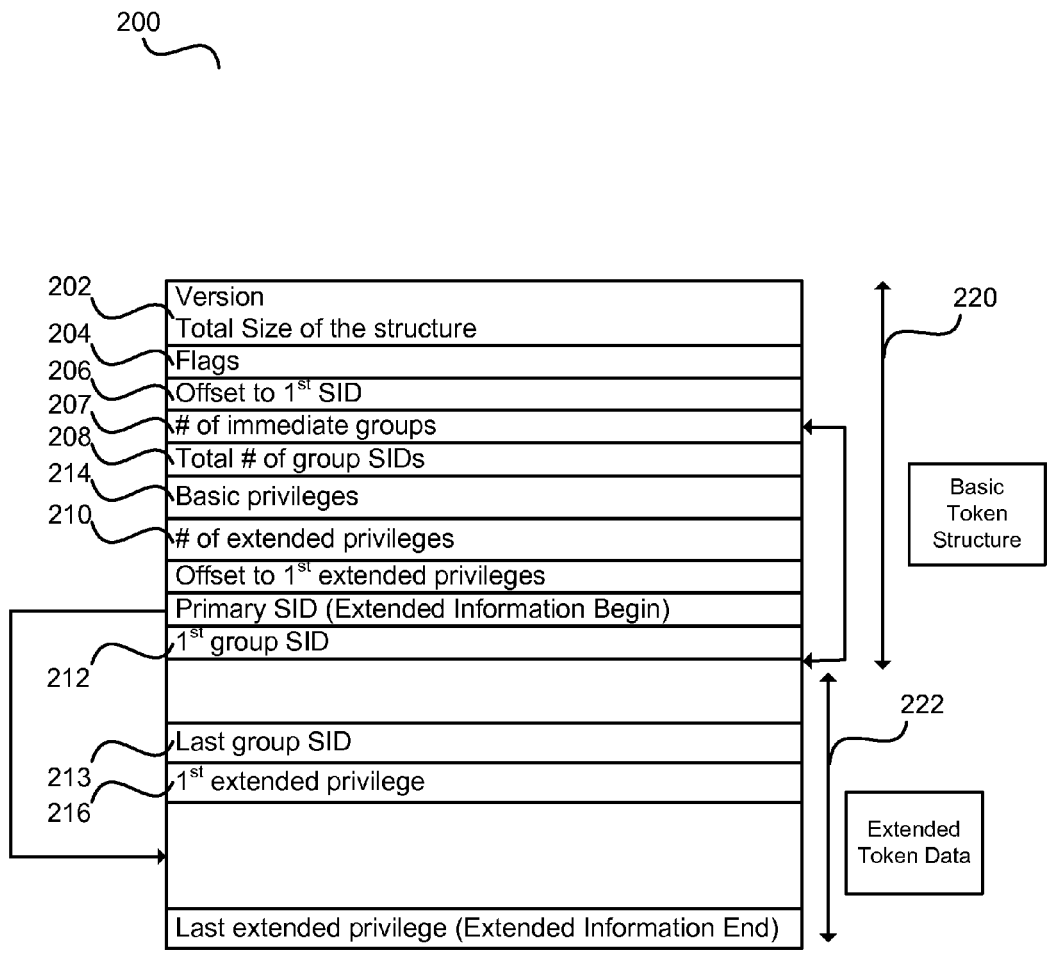
FIG. 2 illustrates the layout of a security token structure 200 according to an embodiment of the present invention.

FIG. 2 illustrates the layout of a security token structure 200 according to an embodiment of the present invention. A security token 200 is used to define a set of identities and a collection of privileges assigned to those identities. Typically, a security token 200 is associated with run-time objects like process, thread, synchronization, and with individual messages in a message queue. The a security token 200 includes fields for identifying the version of the structure 202, flags 204, offsets 206, number of immediate groups 207 and total number of group IDs 208. The structure of a security token 200 also may store the primary owner SID 210, group SID(s) 212, basic privileges 214 and extended privileges 216.

Primary 210 and group 212 SID(s) define the identities associated with the object that has this security token 200. Basic 214 and extended 216 privileges define what privileges are allowed for the object that associated with this security token 200. Basic privilege 214 is a set of privileges valid for the identities specified in the security token 200. Similarly, extended privileges 216 are custom privileges defined for the list of SIDs in the security token 200.

Basic security token structure 200 has offset pointers 206 to extended (optional) data for the security token 200, such as primary 210 and group 212 SIDs associated with this security token 200, and also extended privileges 216 associated with this security token 200. Each individual SID 210,212 in a security token 200 is used in the AccessCheck API call to determine if a given security token 200 has desired access to an object whose SD is specified. Also, the basic 214 and extended 216 privileges in a security token 200 are used in the PrivilegeCheck API call to determine if a given security token 200 has required privileges. The APIs and the use of the security token 200 will be discussed in greater detail with reference to the discussion of the token APIs described herein below.

A string representation of an account is created and the string representation is mapped to a DWord that is used in the security token structure 200. Then, the security token 200 is the object that is associated with the read thread in the system. Therefore, every thread starts with a particular security token 200. A security token 200 includes a basic token structure 220 having a list of identities indicating that this particular thread belong to a particular chamber with a particular account ID, and also that the thread is a member of certain groups. Each security token 200 is represented by sets. Thus, a security token structure includes the structure and multiple sets. The first set is the owner set. That means a unique ID is given to each chamber in the system or each account in the system. Then, there could be zero or more group memberships, group account IDs. Those are given in the extended token data 222.

The security token structure for the desktop is similar. For example, there could be a privilege defined for resetting the desktop or a privilege defined for installing drivers. Thus, if a particular caller has a particular privilege set, then only that caller can make that API call and only that caller can reset the device or install a driver. These are specific privileges. Basic privilege may be only one DWord, so it is tied to basic privileges 214 and then there may be any number of extended privileges 216 that are part of the extended token data 222.

There may be many privileges 214,216, but the privileges 214,216 work exactly the way access checks operate for resources. Thus, if a particular API requires a particular privilege or a particular caller to have a particular privilege, then every caller in the contact chain must have that particular privilege. Only when all the callers have that privilege will the call be allowed to go through. Every token should have at least as much information as the basic token structure 220.

The extended token structure 222 is an optional setting. Thus, as an example, an account may be a member of one or more groups. Accordingly, it has a variable size, i.e., the size is not fixed, whereas the basic token structure size is fixed. A security token 200 is associated with every process and then every thread in the process receives or duplicates that security token 200 at the start. As the security token 200 migrates to different servers, the security token 200 can change. The migrated security token 200 is intersected with the security token of the server. The actual data structure does not change.

Figure 3:
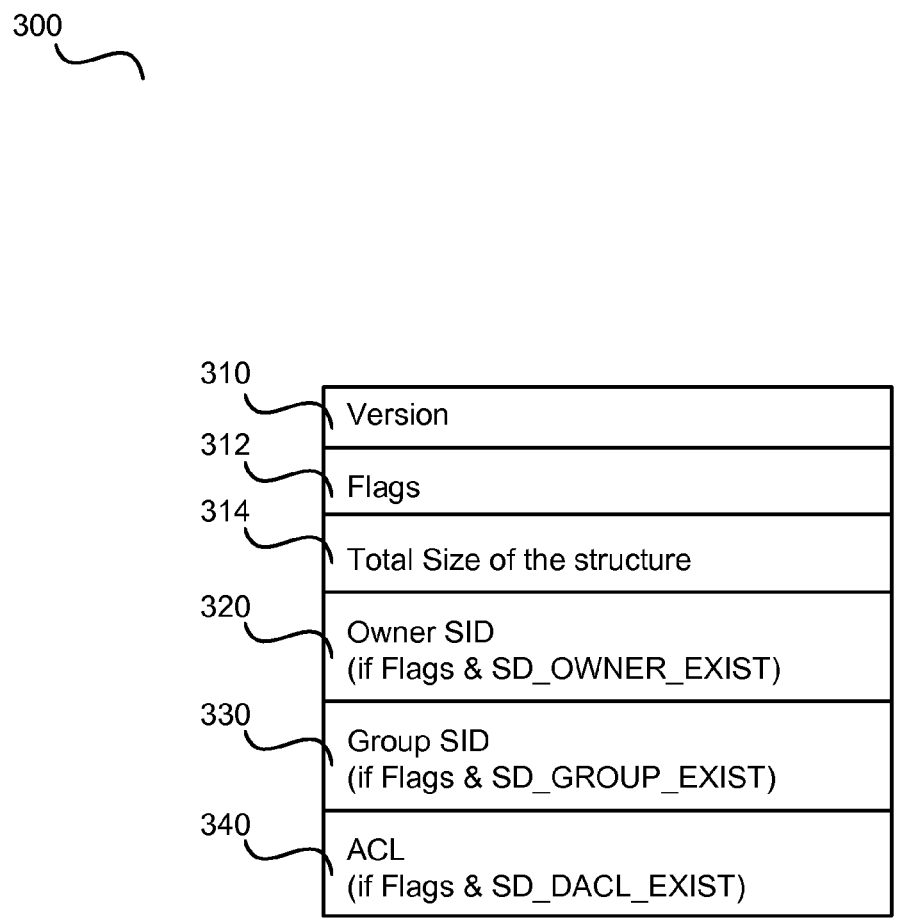
FIG. 3 illustrates a simplified view of a security descriptor layout 300 according to an embodiment of the present invention.

FIG. 3 illustrates a simplified view of a security descriptor layout 300 according to an embodiment of the present invention. The security descriptor 300 is the data structure used to associate permissions with the resource. For a particular resource, the security descriptor 300 defines what accounts have what access to that resource and defines all the rules pertaining to that particular object. Typically, a security descriptor 300 for an object defines an owner SID 320, a group SID 330, and an associated ACL 340.

Since all of these are optional entries, the SD 300 is defined as a variable size structure with Owner SID 320, Group SID 330, and ACL 340 listed at the end of the structure. A version field 310 and a flag field 312 are provided in the SD structure 300 to specify what values are included in the SD 300. A field 314 is also provided for defining the total size of the SD structure 300.

The relationship between the security token (i.e., 200, in FIG. 2) and the security descriptor 300 determines the control of access rights. When a thread accesses a resource, (e.g., a photo, a file is created, e.g., /windows/myphotos/), that call then eventually comes into the server and the server determines whether the caller has access to this resource. The server builds a security descriptor 300 defining access rights to the resource from the call. Therefore, once the server has the security descriptor 300 identifying who can access this resource, then the server looks at the security token (i.e., 200, in FIG. 2) of the caller and determines the identity of the caller. Then, the server attempts to determine whether the identity defined in the security descriptor is in one of the ACEs. If the identity defined in the security descriptor is in one of the ACEs, the server determines what the access rights are for that identity. If the access for that identity is denied, then the call is denied. If the access for that identity says read, then only read permission is given for this caller.

Accordingly, the intersection between a call and the particular resource receiving the call must be identified using a security token and what permissions that identity has in the security descriptor 300 must be determined. Within an operating system, numerous account IDs may be provided. Every thread that starts running inside a process will inherit a token having an account ID for that process. As the thread makes the calls into different fields of service, the token is updated.

Figure 4:
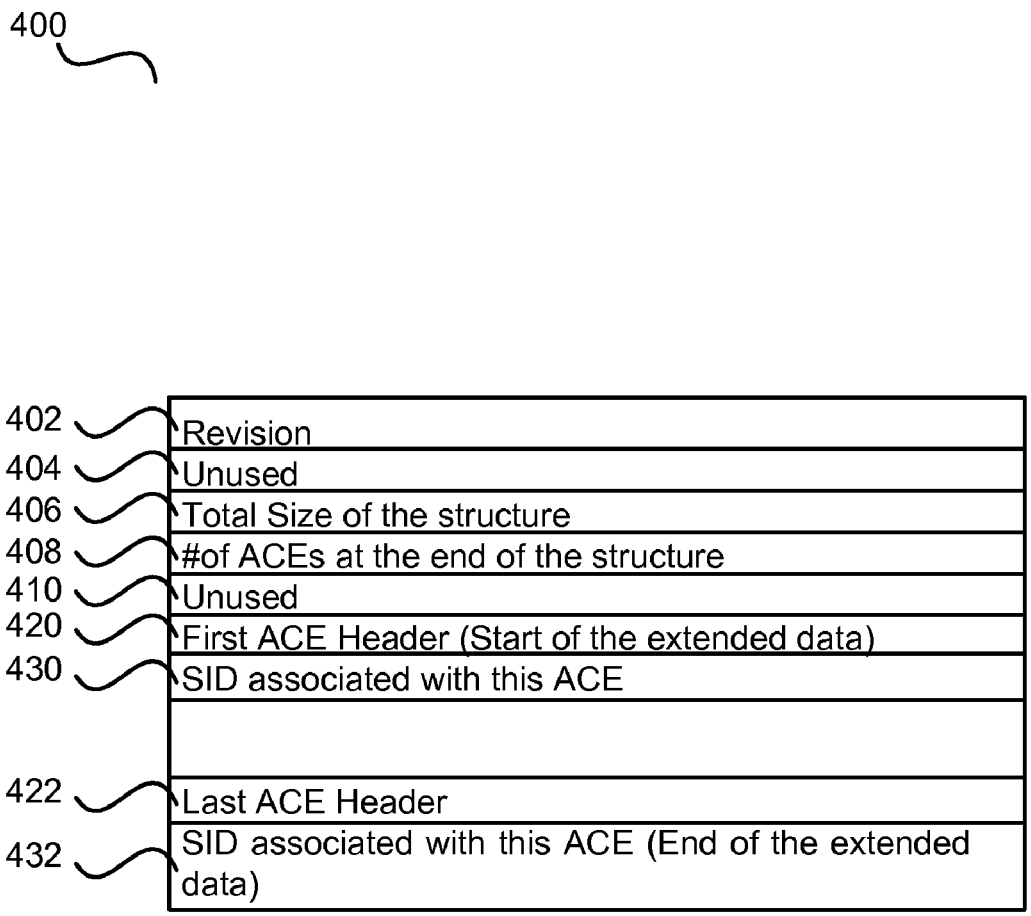
FIG. 4 illustrates an Access Control List (ACL) 400 according to an embodiment of the present invention.

FIG. 4 illustrates an Access Control List (ACL) 400 according to an embodiment of the present invention. The ACL 400 is a collection of Access Control Entries (ACE) that includes ACE headers 420, 422 and SIDs associated with the ACE 430, 432. The ACEs identify what access rights are defined for a given SID. In FIG. 4, the ACL 400 includes a revision field 402, a field that is unused 404, a field defining the total size of the structure 406, a field defining the number of ACEs at the end of the ACL 408 and a second unused filed 410. Since the number of ACEs is not pre-defined, the ACL 400 is a variable length structure.

Each ACE specifies an account ID and what permissions the account ID has on that object. For example, one particular ACE could be account ID get, wherein access is read only for that particular object. Another particular ACE could be account ID administrator access read/write, which provides a collection of all the different ACEs and each of those ACEs defines for a particular account what access is specified for this resource.

On the desktop, the ACE provides different access rights for each entry. The different access rights include Allow, Deny, and Audit. In the WINDOWS® CE operating system, rights are granted for a given ACE. The default return is "deny" when there is no ACE with the required access mask in the ACL.

Figure 5:
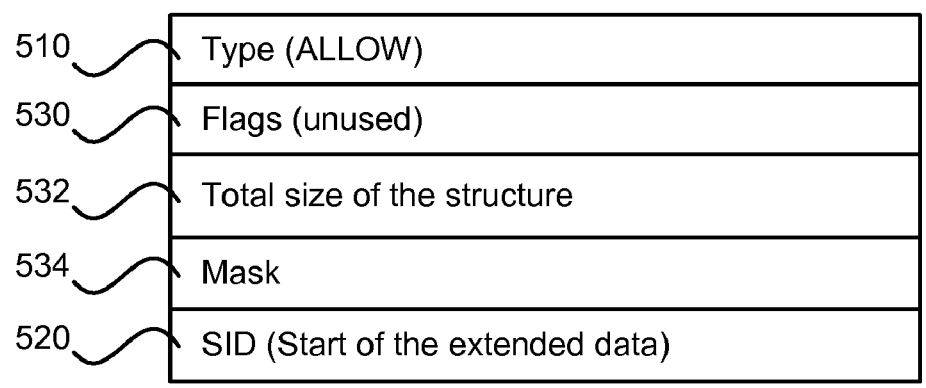
FIG. 5 illustrates a structure for Access Control Entries (ACE) 500 according to an embodiment of the present invention.

FIG. 5 illustrates a structure for Access Control Entries (ACE) 500 according to an embodiment of the present invention. Each ACE 500 defines what type of access is being allowed by this ACE 510 and to which identity (given by the SID) 520. Since SID 520 is a variable length data item, ACE 500 is also a variable length structure. SID data 520 associated with ACE 500 starts at the end of the ACE structure 500. The ACE 500 also includes a field for flags 530, a field for identifying the total size of the structure 532 and a mask field 534.

Figure 6:
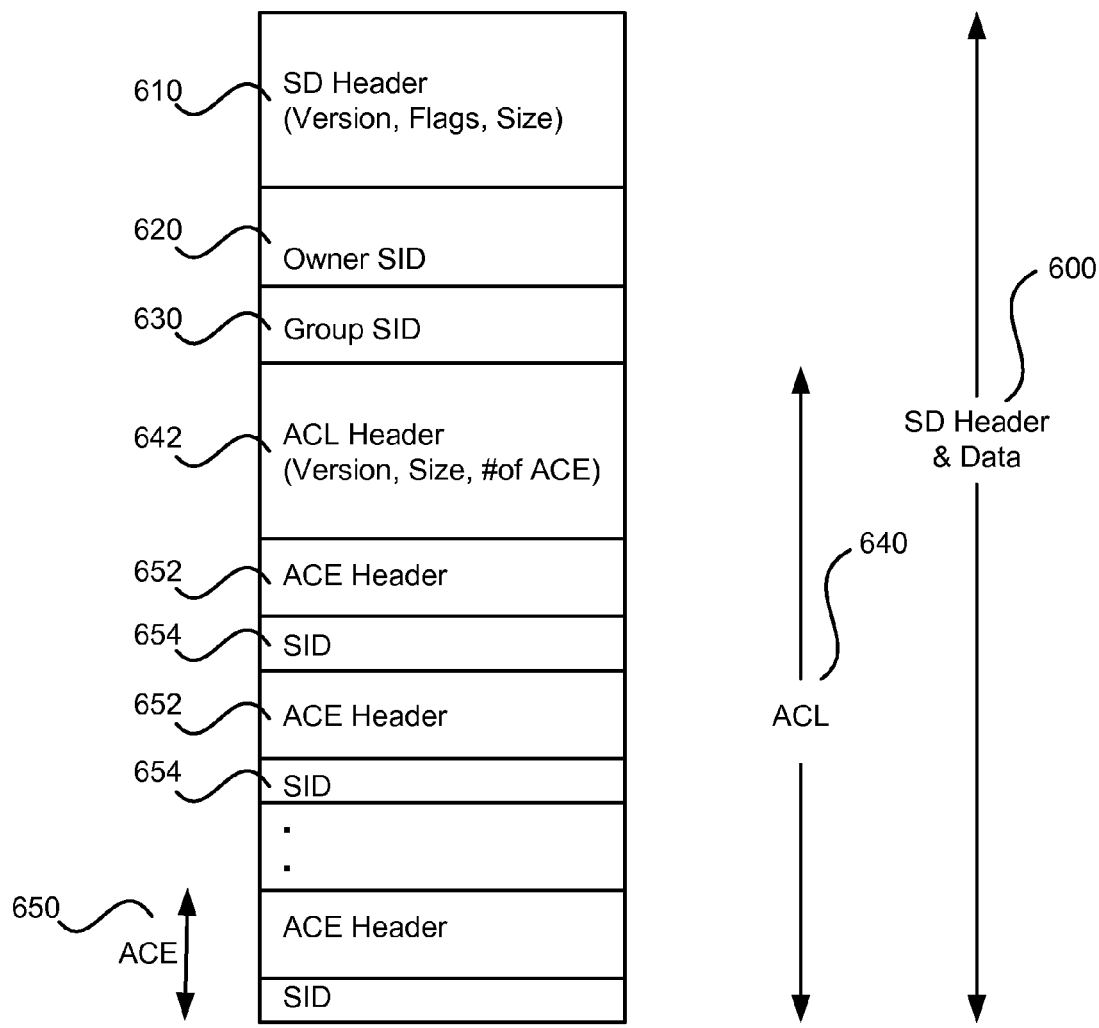
FIG. 6 illustrates a structural layout for a security descriptor (SD) 600 according to an embodiment of the present invention.

FIG. 6 illustrates a structural layout for a security descriptor (SD) 600 according to an embodiment of the present invention. The security descriptor (SD) 600 includes a header 610. The SD header 610 identifies the version, flags and size of the SD 600. The SD 600 next includes an owner security identifier (SID) 620 and a group security identifier (SID) 630. The remaining data forms the access control list (ACL) 640. The ACL 640 includes the ACL header 642 and one or more access control entries (ACEs) 650. The ACL header 642 identifies the version, size and number of ACEs 650. Each ACE 650 includes an ACE header 652 and associated security identifier (SID) 654.

A security infrastructure according to an embodiment of the present invention is provided by the security descriptors, security identifiers, access control lists and access control entries when a process or thread is created. For example, a process token is immutable and is assigned when a process is created. By default, if no security is provided, all processes are treated equal (for token privileges) and the process is assigned a pre-defined system token. This is the default behavior on a system where security is not enabled. In such a system, the trust boundary is the transition point between user mode and kernel mode.

A process token could potentially be a combination of several data points, such as like:
  Exe evidence (path, hash, certificate) that will map to an ID in the account database.
  Basic privileges for a given account in the account database
  Extended privileges for a given account in the account database
  A list of group IDs based on the caller token The first piece of information that is the evidence for a given executable is determined by the secure loader component and is beyond the scope of this document. For this feature purposes, assume that the evidence maps to an ID in the account database. Given this, OS will create a token from the account information in the account database. This token is associated with the process object when the process is created and remains unchanged through the lifetime of the process.

A thread token is created and associated with a thread object when the thread is created. By default, thread token is identical to the token associated with the thread's owner process. The main difference between a process token and a thread token is that the thread token can change over the lifetime of the thread, whereas process token remains unchanged over the lifetime of the process. For example, a thread token can change on:
  Call to Imersonate a Given Token: This will change the calling thread's active token to the security token passed in the call to Impersonate.
  Call to Revert Previous Impersonation: This will update the thread token to the token before the impersonation call.
  Call to Impersonate Current Process: This will update the current thread token to be that of the current active process.
  Thread Return from an API Call: On API call return, kernel will automatically delete all the thread tokens associated with the PSL context from which the thread is returning. In this case, also the current token associated with the thread is updated to the token before the API call.

Figure 7:
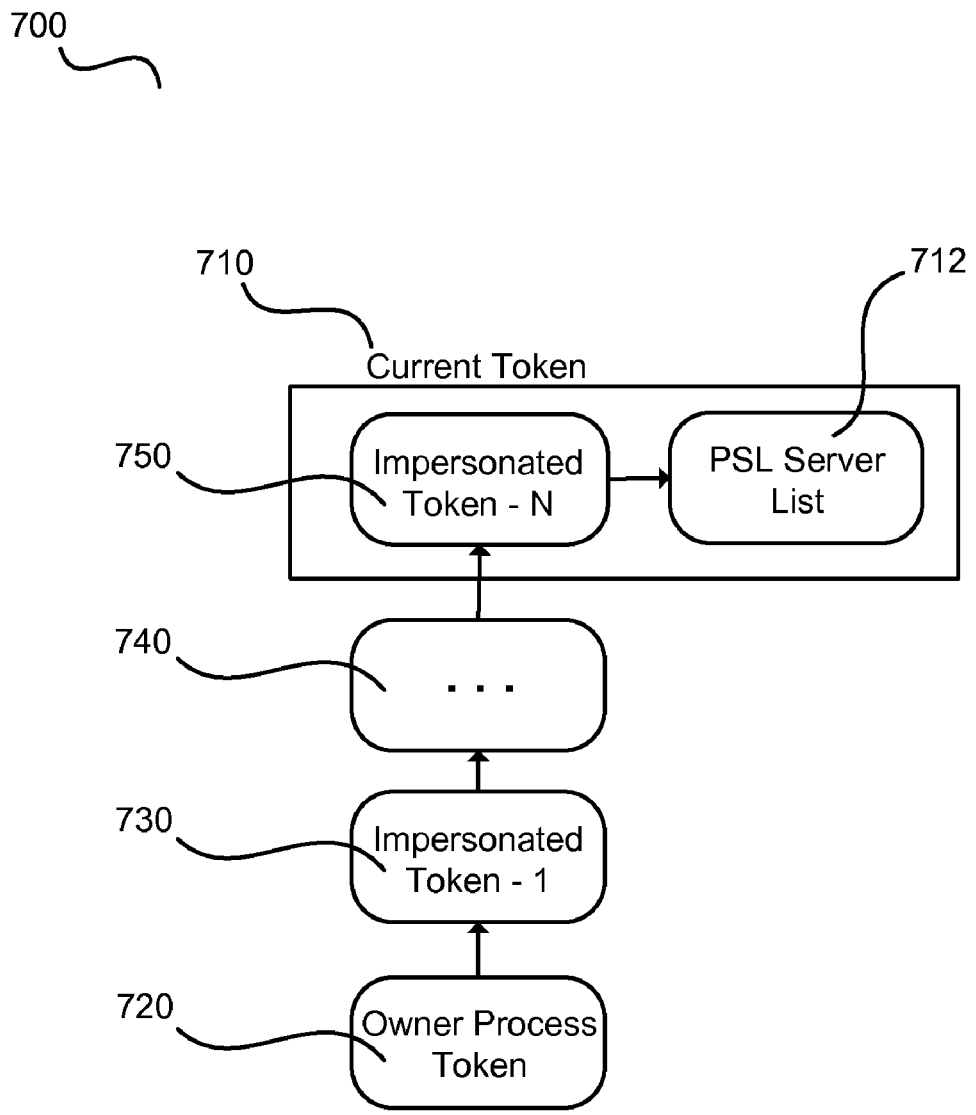
FIG. 7 illustrates a token list arrangement for a thread 700 according to an embodiment of the present invention.

FIG. 7 illustrates a token list arrangement for a thread 700 according to an embodiment of the present invention. To manage multiple tokens for a given thread, a token list 700 is provided. The token list 700 is a linked list of all the tokens associated with a thread. The current active token 710 for a thread is always the token node at the head of the token list 700. In other words, the token list 700 behaves like a LIFO queue (a.k.a. stack) where the last added token in the list is the current token for the thread. All access and privilege checks for the current thread are handled using that specific token only and the current context of the thread. In addition, when a thread returns from an API call, the kernel automatically deletes any token nodes added to this list by impersonation calls in context to the protected server library (PSL) 712. This automatic revert prevents any privilege leaks on API calls.

In an operating system, e.g., WINDOWS® CE, threads may make API calls by transitioning into the server process that handles the corresponding API call. Since each thread has an associated token with a set of identities/privileges defined for that token, the API server needs to take into account the thread's current privileges to decide if the API call is allowed on the current thread or not. There are two possible tokens the API server could use to complete the API call:
  Caller's token: In this case, the API server calls CeAccessCheck (GetCurrentToken( ), . . . ). This would be a potential security risk if the API call comes from a high privileged chamber into a low privileged chamber. Actually there is no concept of high or low privilege. However, for this discussion purposes assume that high privilege chamber has all the privileges of a low privilege chamber and some additional privileges.
  Current process token: In this case, the API server calls CeAccessCheck (ImpersonateCurrentProcess( ), . . . ) where the current thread's token is updated to be the current process (API server's token). This would also be a potential security risk if the API call comes from a low privileged chamber into a high privileged chamber.

Every thread starts with the owner process token 720 at the beginning. Therefore, the owner process token 720 is listed at the bottom of FIG. 7 showing the token layout for a thread 700. The thread can receive a token from a different caller or from a message queue asynchronously. Then, when the thread wants to access a resource based on that token. The thread does not want to use the process token, but instead wants to change its identity. Thus, the thread can call and impersonate one of the APIs, which pushes the token onto the top of the token list. Accordingly, whenever the thread calls in and impersonates a token, that token becomes the top of the list. In FIG. 7, an impersonated token 730 is shown above the owner process token 720. In FIG. 7, a chain of N impersonated tokens 730-750 are shown.

Any resources the thread accesses is checked against the top token 750, i.e., within the current token 710. Whenever impersonation is invoked, the impersonation token 750 is always intersected with the owner process token 720. Thus, whenever the thread accesses resource, the owner process token 720 must exhibit access rights at that resource and the token just impersonated 750 must also have access to that resource. In this manner, the thread may make API calls into the different servers as it is transitioning into different servers. In addition, if there are any servers on the contact chain, all the servers must have access to that resource.

If all three checks are verified, access to the thread is allowed. Importantly, this process is different than providing individual privilege. For example, if the action is based solely on the current token 750 and if the current token 750 happens to have a higher privilege, then that would be an elevation of the privilege. Conversely, if the action is solely based on the caller's token 720, then it has migrated from a high privilege server to a low privilege server. Thus, in both cases a security risk is introduced when only individual privilege is used because of the possible elevation of privilege.

Once an API call is completed, and an API call is returned, the token is reverted with any impersonation that is done in the server to prevent leak of any iteration of privilege. Thus, when the API call returns, even if the server forgets to revert the token it has impersonated, the server is automatically reverted. In this way, the client will always also revert back to whatever it was before the API call when the API call returns that token.

As you can see, there is a security problem if we use only the caller's thread token or only the current process thread token. To solve this problem, we are proposing that the following be taken into consideration when checking access for a resource by a given thread:

All the identities associated with the thread's current token should have access to the resource.

All the identities associated with all the chambers in the current thread callstack (up to impersonation boundary) should have access to the resource.

All the identities associated with saved context for that thread should have access to the resource. This check is mainly used when access check is performed on behalf of the caller in a different thread other than calling thread.

This change will affect how access/privilege is checked for a given thread and object. For the code to get access to any object, both the thread's current token 750 and the API server's token, i.e., the owner process/thread token 720, should have access to that object. For the code to gain any privilege, both the thread's current token 750 and the API server's token 720 (in this example) should have that privilege set. As a result, code, by default, will always run with the least access/privilege set as the thread's current token 750 is always combined with current thread's callstack chain 700. This provides a secure process to handle security issues arising from using either the caller's token only 720 or current process token only 750 when performing access/privilege check on the current thread. A discussion of some of the token APIs is provided herein below with reference to Table 1.

| Name | Arguments | Returns |
|---|---|---|
| CeCreateToken (pToken, flags) | Pointer to token structure, flags | Handle to the token |
| CeImpersonateToken (hToken) | Handle of a token | TRUE if impersonate successful; otherwise FALSE. |
| CeImpersonateCurrentProcess (void) | None | TRUE if the current thread's token is updated; otherwise FALSE |
| CeRevertToSelf (void) | None | None |
| CeGetProcessAccount (hProcess) | Handle of a process | Owner account associated with the given process |
| CeGetThreadAccount (hThread) | Handle of a Thread | Owner account associated with the given thread |
| CeGetOwnerAccount (hToken) | Handle of a token | Owner account associated with the given token |
| CeGetGroupAccount (hToken, idx) | Handle of a token, and index of the group account | Group account associated with the given token |
| CeAccessCheck (pSD, hToken, AccessRequired) | Pointers to SD, handle to the token, and required access mask | TRUE if the given token has desired access in the given SD; otherwise FALSE This API checks for given access for each account in the given token and for each ACE listed in the given SD. |
| CePrivilegeCheck (hToken, pPrivileges, cPrivileges) | Handle to a token, array of privileges to check for, and #of privileges | TRUE if the given token has requested privileges; otherwise FALSE. This API checks for given privilege access in the given |

-continued

| Name | Arguments | Returns |
|---|---|---|
| | | token. For the API to succeed, all the given privileges (specified in the pPrivileges array) have to be present in the token's basic or extended privilege list. |
| GetCurrentToken (void) | None | Pseudo-handle to the thread's current token. |

The description that follows is for core impersonation and access check APIs. The first token listed in Table 1 is the CeCreateToken (pToken, flags) field provides a pointer to the token structure, and flags. A handle to the token is returned.

The CeImpersonate Token may be used by any applications to impersonate the given token. This is also used to perform an asynchronous call on behalf of a caller. Implementation for this API is to push this token to the top of the stack for the current thread's token list and make this token the current token for the thread. This API call will always merge the current process token with the specified token to this API call and the merged token is treated as the current thread's token.

In addition, current process identity (given by current process token) is implicitly added to the passed in token identities. The main reason for doing this is to prevent the caller from gaining any privileges with this API call. In other words, this API will be restricted to downgrading or at the most have same privileges as the current process. This enables code execution at the least privilege level by default. Usage for that would be as follows: at the time of the API call, the current thread's token is stashed away and is used later by the asynchronous thread in the API server to perform the API call with the caller's context at the time of the call.

The CeImpersonateCurrentProcess (void) token returns TRUE if the current thread's token is updated; otherwise it returns FALSE. The CeRevertToSelf Token is used to "pop" the token of the current thread's token list. Typically this is used by API servers to un-do any token impersonation done via CeImpersonateToken or CeImpersonateCurrentProcess API calls. The CeImpersonateCurrentProcess Token is used to truncate the token list for the current thread to the current process token. This effectively "pushes" the current process token to the head of the current thread's token list.

The CeAccessCheck Token takes in three arguments. The first argument is a SD representing permission set for an object for which we are requesting access. The second argument is a token that is the identity requesting access to the object. The third argument is desired access to the object. The CeAccessCheck Token is used to check for given access for each account in the given token and for each ACE listed in the given SD. This API checks for given access for each account in the given token and for each ACE listed in the given SD.

The CePrivilegeCheck Token checks for given privilege access in the given token. This API checks for given privilege access in the given token. For the API to succeed, all the given privileges (specified in the pPrivileges array) have to be present in the token's basic or extended privilege list.

CeGetProcessAccount (hProcess) token returns the owner account associated with the given process. The CeGetThreadAccount (hThread) token returns the owner account associated with the given thread. The CeGetOwnerAccount (hToken) token returns the owner account associated with the given token. The CeGCetGroupAccount (hToken, idx) token uses the handle of a token and the index of the group account to return the group account associated with the given token. The GetCurrentToken (void) token provides a pseudo-handle to the thread's current token.

Figure 8:
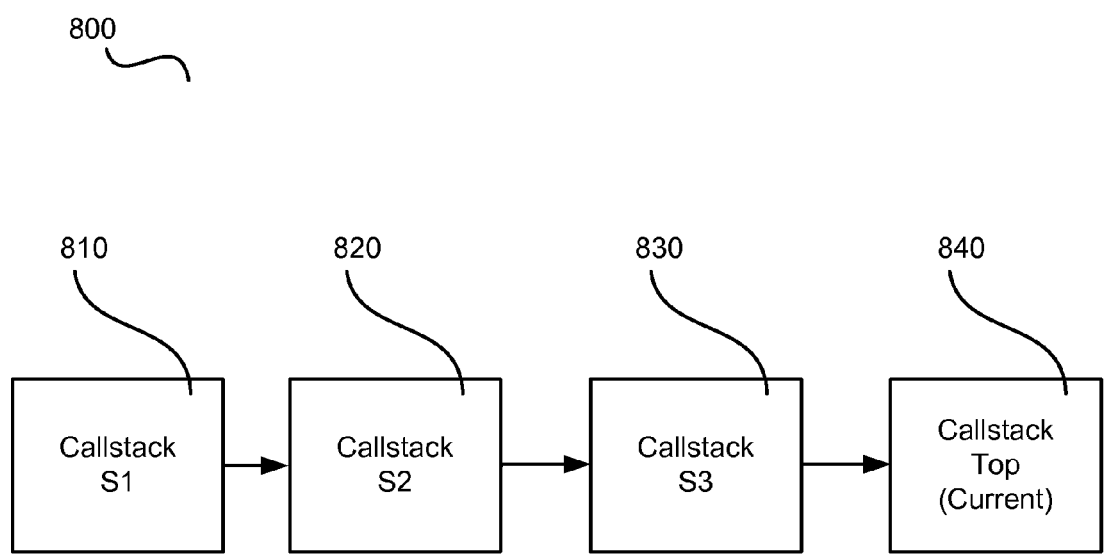
FIG. 8 illustrates a callstack list for a thread in a PSL call 800 according to an embodiment of the present invention.

FIG. 8 illustrates a callstack list for a thread in a PSL call 800 according to an embodiment of the present invention. In operations, the kernel maintains a list of callstack structures with every thread. On every PSL call and return the callstack list 800 for the thread is updated. In FIG. 8, four callstacks 810, 820, 830, 840 are shown. The last callstack 840 is on top and is the current callstack. Upon a PSL call entry, a new callstack structure is added. Upon API call return, the top most callstack structure is deleted. The callstack structure 800 corresponds to one PSL server that the thread has migrated to.

Figure 9:
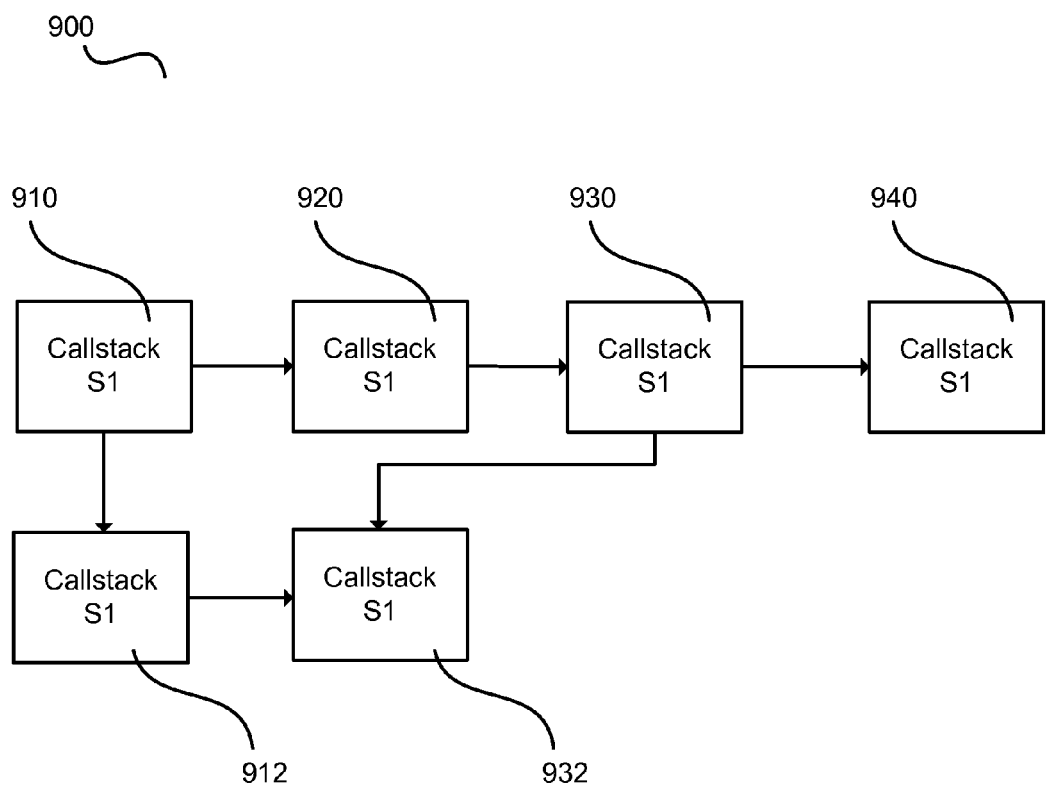
FIG. 9 is a block diagram illustrating the link between an impersonation list and a callstack list for a thread 900 according to an embodiment of the present invention.

FIG. 9 is a block diagram illustrating the link between an impersonation list and a callstack list for a thread 900 according to an embodiment of the present invention. Similar to the callstack structure, tokens for a thread are maintained in a list with the current impersonation at the top of the token list. In FIG. 9, four callstacks 910, 920, 930, 940 are shown. The last callstack 940 is on top and is the current callstack. To ensure there are no privilege leaks across PSL calls, the kernel maintains a link between the impersonation list for the current thread and the callstack list for the current thread. Each impersonation node is associated with the callstack structure where the impersonation call happened.

Thus, in FIG. 9, the thread belonging to an application migrated to PSL server S1 910. PSL server S1 calls impersonation API and as a result an impersonation node 912 was added to the impersonation list and associated callstack structure S1 is marked in impersonation node T1 912. Next the PSL Server S1 migrated to PSL server S2 920. S2 does not make any impersonation calls. Next when the thread migrates to S3 930 on the same call and S3 server calls for an impersonate token. A new impersonation node 932 is added to the token list and associated callstack structure S3 930 is noted in T2 932.

Resource checks are performed at different stages of the thread lifetime. For example, consider an access check from S1 910. In this case, a resource is being checked for access when the thread migrated to the S1 process 910. The following checks are performed:

All the identities in token T1 should have access to the resource

All the identities in token associated with process S1 should have access to the resource Next, consider an access check from S2 920. In this case, a resource is being checked for access when the thread migrated to S2 920 process via S1 910 process. In this case, the following checks are performed:

All the identities in token T1 should have access to the resource

All the identities in token associated with process S2 should have access to the resource All the identities in token associated with process S1 should have access to the resource In performing an access check from S3 930, the thread migrates to process S3 930 via S2 920 via S1 910. An access check was called from S3 930. The following checks are performed:

All the identities in token T2 should have access to the resource

All the identities in token associated with process S3 should have access to the resource Note that in this case even though thread full context has processes S2 920 and S1 910 in its callchain access check is not done against those processes since S3 930 impersonates a token and impersonation effectively cuts the callstack chain.

In performing an access check from the current process (listed as Callstack Top 940), there are no more token impersonations between the S3 process 930 and the current process 940 in the thread callstack chain 900. The following checks are performed:

All the identities in token T2 should have access to the resource

All the identities in token associated with current process-to-process S3 in the callstack chain should have access to the resource.

So the basic rule for access check includes whether the current token, which is the token at the bead of the token list for the current thread, should have access to the resource and whether all processes from current process to the last process which called impersonation (inclusive) should have access to the resource.

A CeGetAccessMask API may be provided to return the maximum access assigned to a token for a given SD. Such an API may be implemented using three arguments:

A token which has the list of identities we want to check access for

A security descriptor which lists the ACEs associated with different IDs for a given resource An [out] parameter to return the maximum access set for the given SD and token combination.

Implementation for this API is straightforward: for each ID in the token, a check is performed to determine whether there is an Allow ACE in the SD. If there is, the access mask associated with that ACE is added to the access mask value to be returned. This step is repeated for each token in the current thread context (up to the last impersonation) and returns only that access mask which is set in all the tokens. Note that unlike CeAccessCheck, this API call needs to scan all the ACEs in SD to get a union of all access mask with matching IDs from the token.

In addition, the CeDuplicateToken API may be provided by taking in the following arguments:

Handle to the source token caller is trying to copy.

[out] pointer to the handle to the new copied token object copies the token object within the calling process.

Figure 10:
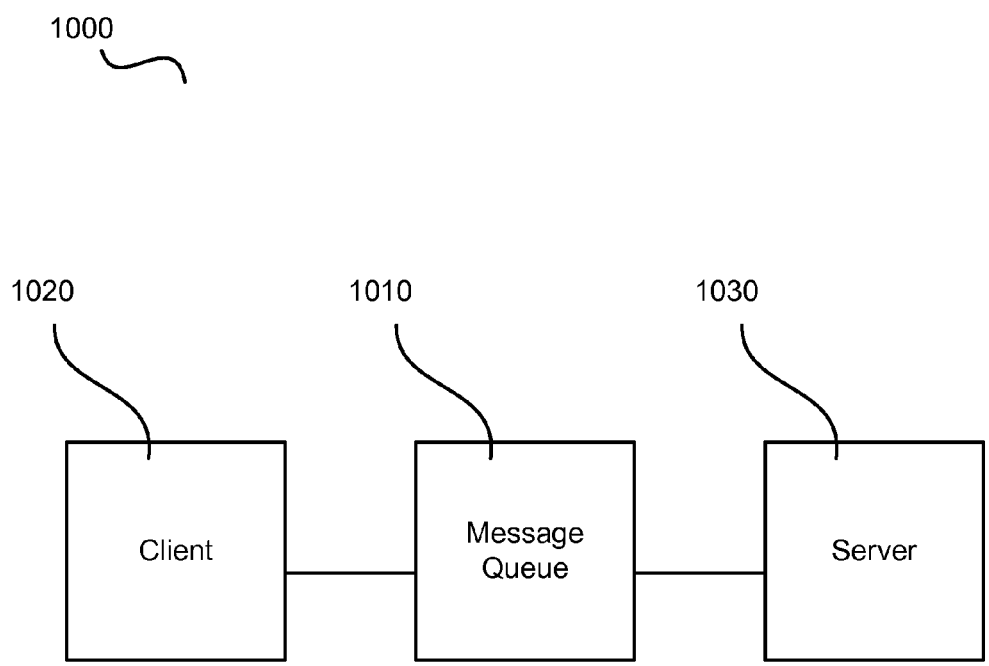
FIG. 10 illustrates a message queue system 1000 according to an embodiment of the present invention.

FIG. 10 illustrates a message queue system 1000 according to an embodiment of the present invention. A message queue 1010 provides asynchronous messaging between a client 1020 and a server 1030 process according to an embodiment of the present invention. The message queue 1010 allows a client 1020 to open a write end of the message queue 1010 and the server 1030 to open the read end of the message queue 1010. The client 1020 and server 1030 may post messages and other data in the message queue 1010. Multiple message queues 1010 may be provided and such message queues 1010 operate asynchronously. Thus, as the client 1020 writes a message and then leaves, the client 1020 does not wait for acknowledgement or any type of signal. The server 1030 may then pick up the message and perform an action based on the retrieved message. When the server 1030 picks up the message, the server 1030 has to have the security credentials of the thread that actually holds that message at the point of writing that message. The contacts can change by the time the server 1030 reads that message so a copy of the contact snapshot must have been made and written with the message so that when the server 1030 reads the message, the server can actually access the snapshot, impersonate the snapshot and then author the message and send the results back.

In addition to the process of asynchronously passing a message and the identity of who sent that message to a server 1030 so the server 1030 can act on their behalf, the message and the identity of the poster of the message and the entire security contacts of the poster of the message that exist at the time when the message is posted also are part of the process. In this way, a more secure decision may be made at a later time. However, those skilled in the art will recognize that the present invention is not meant to be limited to using a message queue as described herein. Rather, other techniques for providing the server the contacts chain for the thread are possible.

When a process starts, it is assigned some identity and each of the threads in that process are given that identity. As the threads migrate to other processes on the system, these threads accumulate the identities of those other processes so that when a security decision regarding the threads is initiated, all of those identities may be intersected to determine the access privileges of the thread. Further, the process is not meant to be specific to any particular server. Rather, any server can use this model. On the WINDOWS® operating system, for example, if a data token is to be input, the particular privilege, i.e., impersonation privilege, must exist. Impersonations are allowed because an impersonation results in the worst case to a downgrade in rights.

In a scenario involving multiple callers, on a desktop for example, when an application calls create file or any other APIs that is exported by the operating system, the thread stops at the boundary of the user in kernel mode and another thread inside the kernel will spin off and perform the action for that API and then return the call back to the thread. Thus, the thread is actually transitioning from one process to the other on the desktop. Whereas, on a WINDOWS® CE operating system, when an application makes an API call, the thread actually migrates into the server process.

Typically, server processes are higher privilege than clients. Accordingly, if an application calls a register open key to open a registry and that particular registry is a protected key that a low privilege application cannot read, the call on the thread and the thread will migrate into the server process that actually implements the registry APIs. If that server process carries the access key, this is that same kind of behavior because the caller's security contacts are not taken into account. However, if the caller's security contacts are compared with the current security contacts, then the access would be denied to that protected resource.

The desktop WINDOWS® operating system and the Windows Mobile® operating system are different since the threads of the Windows Mobile® operating system actually migrate and the security contact information must be maintained with the thread. Only then can a decision be made based on the entire contact when access to the resource is requested. For the desktop, at the point when transitioning from user mode to kernel mode, the current thread contacts have to be copied and then on the kernel thread, the caller is transitioned and the action is completed as if completed on behalf of the caller. Once the action is completed, a transition back to the original security contacts is performed and the results are returned back to the caller.

The security contacts for a particular thread are serialized and deserialized. In the Windows Mobile® operating system, for example, database records are protected so that who can update and who can edit the database records is restricted. To provide security, security contacts of records are saved with the records. Thus, when a call comes in to, for example, update a record, the security contacts of the record and the caller may also be conveyed to see if the caller has enough access to perform the requested database operation. To accomplish this process, the security contacts must be able to be processed in an offline database because the database is persistent. Accordingly, a device running the Windows Mobile® operating system is set and when the device comes back, a determination is made whether the database records have the same contacts still preserved. When caller is identified, all the accounts in that contact chain are determined and then saved as a file. When a new call comes in, a file is again built up and compared to the saved file to ensure that the caller is a subset of accounts in the contact chain.

If an application makes a call into the server, the server performs the action in a thread. In a different thread, the caller may be impersonated so that all the resources are accessed on behalf of the caller. The snapshot of the of the security contacts from a client will basically include, reading the sender's name, all the callers in the current contact chain, what accounts or different accounts are in the contact chain and whether a migration to a different servers has occurred. For example, application 4RXE could be calling to a server and then that same thread calls into another server. Thus, there could be multiple servers on the contact chain. However, every one of them must have proper access. Accordingly, when a contact snapshot is taken, all the accounts that are currently in the contact must be captured.

Notably, as a thread migrates through a system, its security contacts changes because it goes through different servers and has different rights. The intersection of all of their rights must be determined. The ability to take a snapshot of one point in time is required to make security decisions. In other words, when a security check is to be made, all the IDs that are verified need to be save so the check can be ran asynchronously or later on.

The systems and components described above can be implemented as part of networked, distributed, or other computer-implemented environment. The systems and components can communicate via a wired, wireless, and/or a combination of communication networks. A number of client computing devices, including desktop computers, laptops, handhelds, or other smart devices can interact with and/or be included as part of the system. In alternative embodiments, the various components can be combined and/or configured according to a desired implementation. Other embodiments and configurations are available.

Figure 11:
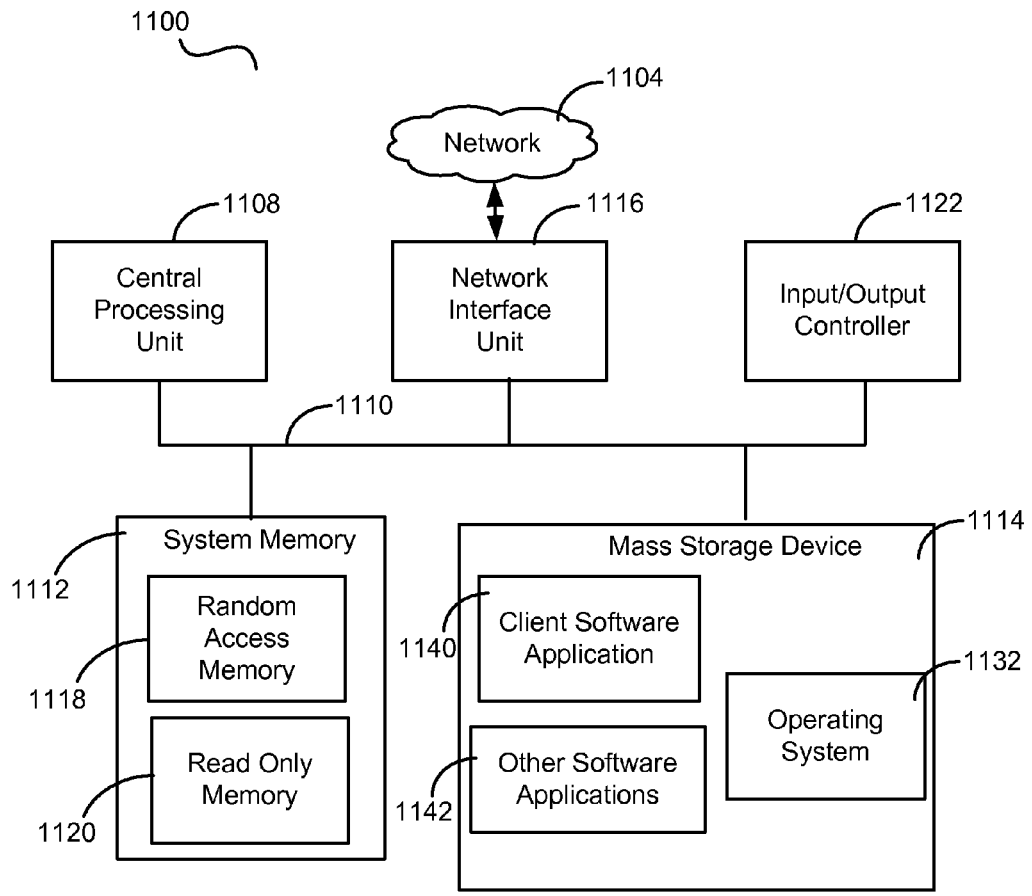
FIG. 11 illustrates a computing environment in which embodiments of the invention may be implemented.

Referring now to FIG. 11, the following discussion is intended to provide a brief general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 11, an illustrative operating environment for embodiments of the invention will be described. As shown in FIG. 11, computer 1100 comprises a general-purpose desktop, laptop, handheld, or other type of computer capable of executing one or more application programs. The computer 1100 includes at least one central processing unit 1108 ("CPU"), a system memory 1112, including a random access memory 1118 ("RAM") and a read-only memory ("ROM") 1120, and a system bus 1110 that couples the memory to the CPU 1108. A basic input/output system containing the basic routines that help to transfer information between elements within the computer, such as during startup, is stored in the ROM 1120. The computer 1100 further includes a mass storage device 1114 for storing an operating system 1132, application programs, and other program modules.

The mass storage device 1114 is connected to the CPU 1108 through a mass storage controller (not shown) connected to the bus 1110. The mass storage device 1114 and its associated computer-readable media provide non-volatile storage for the computer 1100. Although the description of computer-readable media contained herein refers to a mass storage device, such as a hard disk or CD-ROM drive, it should be appreciated by those skilled in the art that computer-readable media can be any available media that can be accessed or utilized by the computer 1100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 1100.

According to various embodiments of the invention, the computer 2 may operate in a networked environment using logical connections to remote computers through a network 1104, such as a local network, the Internet, etc. for example. The computer 1100 may connect to the network 1104 through a network interface unit 1116 connected to the bus 1110 It should be appreciated that the network interface unit 1116 may also be utilized to connect to other types of networks and remote computing systems. The computer 1100 may also include an input/output controller 1122 for receiving and processing input from a number of other devices, including a keyboard, mouse, etc. (not shown). Similarly, an input/output controller 1122 may provide output to a display screen, a printer, or other type of output device.

As mentioned briefly above, a number of program modules and data files may be stored in the mass storage device 1114 and RAM 1118 of the computer 1100, including an operating system 1132 suitable for controlling the operation of a networked personal computer, such as the WINDOWS® operating systems from Microsoft Corporation of Redmond, Wash. The mass storage device 1114 and RAM 1118 may also store one or more program modules. In particular, the mass storage device 1114 and the RAM 1118 may store client application programs 1140 and other software applications 1142. A computer 1100, as illustrated in FIG. 11, may be configured to execute instructions that provide a security infrastructure according to embodiments of the present invention as described in FIG. 1-10.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer storage medium, wherein the computer storage medium does not include a transmission signal, the computer storage medium including executable instructions which, when executed by a processor, provide a security infrastructure for controlling access by an associated subject to resources, by:
   providing an operating system running on a processor, the processor executing an application via the operating system;
   implementing, by the processor, a security structure over the operating system for controlling resources accessed by the application and calls that the application may make, the processor implementing the security structure by:
      when the processor creates a run-time object, providing a security identifier by the processor for defining a unique identifier for an associated subject and for specifying an account associated with the associated subject;
      mapping the unique identifier to an entry in an account database maintained in memory for determining basic and extended privileges assigned to the security identifier;
      accumulating, by the processor, identities of associated subjects along migration of the associated subject;
      creating, by the processor, a security token for defining a set of identities and a collection of privileges assigned to the set of identities based on the determination of the basic and extended privileges assigned to the security identifier; and
      determining, by the processor, access privileges of the associated subject by:
         intersecting all of the accumulated identities of the associated subject and the collection of privileges; and
      capturing a call chain context of the associated subject and analyzing the associated subject to verify that each accumulated identity in the call chain and each associated subject has access to the requested resource before granting access to the resource thereby enabling minimal privilege by default, the call chain comprising an application call to a register open key to open a registry, the registry comprising a protected key that cannot be read by a low privilege application, the application call being migrated into a server process that carries an access key for the registry and which implements registry application program interfaces (APIs).

2. The computer storage medium of claim 1, wherein the associated subject comprises a process or a thread of a process.

3. The computer storage medium of claim 1, wherein a relationship between the security token and a security descriptor determines control of access rights by an associated subject to a requested resource.

4. The computer storage medium of claim 1, wherein the determining access privileges uses each security identifier in a security token to determine whether a security token has requested access to a resource specified by a security descriptor, access being granted to a requested resource only when every caller in the contact chain has a privilege granting access to the requested resource.

5. The computer storage medium of claim 1 further comprising:
   building a security descriptor defining access rights to the resource;
   identifying the associated subject according to the security token;
   determining whether the identity defined in the security descriptor is included in an access control entry in the security descriptor;
   determining access rights available to the identity based upon the access control entry; and
   granting access rights to the identity according to the determined access rights.

6. The computer storage medium of claim 1 further comprising maintaining a list of all tokens related to an associated subject in a security token list, wherein a current active token is always at the head of the security token list, all access and privilege checks for the associated subject being handled using the current active security token and a current context of the associated subject by comparing resources an associated subject requests access to against the current active security token at the head of the security token list.

7. The computer storage medium of claim 1 further comprising writing, on a client side, a security context of an associated subject in a message queue, asynchronously retrieving, on the server side, the security context of the associated subject from the message queue, impersonating the associated subject by copying the retrieved security context of the associated subject to be impersonated.

8. The computer storage medium of claim 1 further comprising granting access to a requested resource when all identities associated with the current security token of an associated subject has access to the request resource, all identities associated with all the chambers in a callstack of the current associated subject has access to the request resource and all identities associated with a saved context for the associated subject has access to the requested resource.

9. The computer storage medium of claim 1 further comprising storing security contacts in an offline database for offline processing.

10. A security infrastructure implemented over an operating system by a processor, comprising:
a security identifier created by the processor for defining a unique identifier for an associated subject and for specifying an account associated with the associated subject;
a security token created by the processor for defining a set of identities and a collection of privileges assigned to the set of identities based on the determining basic and extended privileges assigned to the security identifier, the basic and extended privileges comprising one or more access privileges of the associated subject, the one or more access privileges being determined by:
intersecting the set of identities and the collection of privileges; and
capturing a call chain context of the associated subject and analyzing the associated subject to verify that an identity in a call chain and the associated subject has access to a requested resource before granting access to the resource thereby enabling minimal privilege by default, the call chain context comprising an application call to a register open key to open a registry, the registry comprising a protected key that cannot be read by a low privilege application, the application call being migrated into a server process that carries an access key for the registry and which implements registry application program interfaces (APIs);
a security descriptor created by the processor for defining accounts having access to the requested resource and rules pertaining to the process; and
an access control list created by the processor, the access control list including at least one access control entry for identifying access rights for a security identifier.

11. The security infrastructure of claim 10, wherein the security token includes fields for identifying the version of the structure, flags, offsets, number of immediate groups and total number of group identifiers.

12. The security infrastructure of claim 11, wherein the security token further includes a primary owner security identifier, group security identifier, basic privileges and extended privileges.

13. The security infrastructure of claim 12, wherein the primary and group security identifiers define identities of associated subjects of the security token.

14. The security infrastructure of claim 12, wherein a basic privilege comprises a set of privileges valid for the identities specified in the security token.

15. The security infrastructure of claim 12, wherein extended privileges comprises custom privileges defined for security identifiers in the security token.

16. A method executed by a processor for granting least privilege access for an associated subject, comprising:
providing an operating system running on a processor, the processor executing an application via the operating system;
implementing, by the processor, a security structure over the operating system for controlling resources accessed by the application and calls that the application may make, the processor implementing the security structure by:
when the processor creates a run-time object, providing a security identifier by the processor for defining a unique identifier for an associated subject and for specifying an account associated with the associated subject;
mapping the unique identifier to an entry in an account database maintained in memory for determining basic and extended privileges assigned to the security identifier;
accumulating, by the processor, identities of associated subjects along migration of the associated subject;
creating, by the processor, a security token for defining a set of identities and a collection of privileges assigned to the set of identities based on the determination of the basic and extended privileges assigned to the security identifier; and
determining, by the processor, access privileges of the associated subject by:
intersecting all of the accumulated identities of the associated subject and the collection of privileges; and
capturing a call chain context of the associated subject and analyzing the associated subject to verify that each accumulated identity in the call chain and each associated subject has access to the requested resource before granting access to the resource thereby enabling minimal privilege by default, the call chain comprising an application call to a register open key to open a registry, the registry comprising a protected key that cannot be read by a low privilege application, the application call being migrated into a server process that carries an access key for the registry and which implements registry application program interfaces (APIs).

17. The method of claim 16 further comprising:
writing, on a client side, a security context of an associated subject in a message queue,
asynchronously retrieving, on the server side, the security context of the associated subject from the message queue,
impersonating the associated subject by copying the retrieved security context of the associated subject to be impersonated,
analyzing the copied security context to build a security descriptor defining access rights to the request resource;
identifying the associated subject according to the security token;
determining whether the identity defined in the security descriptor is included in an access control entry in the security descriptor; and
determining access rights available to the identity based upon the access control entry.

18. The method of claim 16 further comprising granting access to a requested resource when all identities associated with the current security token of an associated subject has access to the request resource, all identities associated with all the chambers in a callstack of the associated subject has access to the request resource and all identities associated with a saved context for the associated subject has access to the requested resource.

* * * * *